United States Patent [19]

Duncan

[11] 4,403,464
[45] Sep. 13, 1983

[54] ACRYLIC COATED/POLYVINYLIDENE CHLORIDE COATED POLYOLEFIN FILM

[75] Inventor: Gary L. Duncan, Pittsford, N.Y.

[73] Assignee: Mobil Oil Corporation, New York, N.Y.

[21] Appl. No.: 252,698

[22] Filed: Apr. 9, 1981

Related U.S. Application Data

[60] Continuation of Ser. No. 73,830, Sep. 10, 1979, abandoned, which is a division of Ser. No. 909,426, May 25, 1978, abandoned, which is a continuation of Ser. No. 711,910, Aug. 5, 1976, abandoned.

[51] Int. Cl.$^3$ .................... B65B 51/10; B32B 27/08
[52] U.S. Cl. .......................... 53/452; 53/463; 53/477; 428/35; 428/349; 428/518; 428/520
[58] Field of Search ............ 428/349, 518, 520, 35; 53/452, 463, 477; 426/127

[56] References Cited

U.S. PATENT DOCUMENTS

| | | | |
|---|---|---|---|
| 3,309,330 | 3/1967 | Settlage | 260/29.6 |
| 3,394,029 | 7/1968 | MacArthur | 117/138.8 |
| 3,676,185 | 7/1972 | Phillips et al. | 428/349 |
| 3,753,769 | 8/1973 | Steiner | 428/349 |
| 3,924,051 | 12/1975 | Wiggins et al. | 428/520 |
| 3,965,271 | 6/1976 | Harrington | 426/515 |
| 4,048,428 | 9/1977 | Baird et al. | 428/518 |
| 4,058,649 | 11/1977 | Steiner | 428/518 |
| 4,064,315 | 12/1977 | Bivans et al. | 428/518 |
| 4,105,818 | 8/1978 | Scholle | 428/518 |
| 4,121,006 | 10/1978 | Harada et al. | 428/172 |

*Primary Examiner*—George F. Lesmes
*Assistant Examiner*—E. Rollins Buffalow
*Attorney, Agent, or Firm*—Alexander J. McKillop; James F. Powers, Jr.; Edward J. Trojnar

[57] ABSTRACT

A single-ply polyolefin film coated on one side with a heat sealable acrylic-based interpolymer consisting essentially of an alpha-beta monoethylenically unsaturated carboxylic acid and neutral monomer esters comprising an alkyl acrylate and an alkyl methacrylate ester or mixtures thereof, and on the other side with a heat sealable polyvinylidene chloride-based multipolymer; said film being useful in diverse packaging applications.

12 Claims, No Drawings

ACRYLIC COATED/POLYVINYLIDENE CHLORIDE COATED POLYOLEFIN FILM

CROSS-REFERENCE TO RELATED APPLICATIONS

This application is a continuation of Ser. No. 73,830, filed on Sept. 10, 1979, now abandoned, which in turn is a division of application Ser. No. 909,426, filed May 25, 1978, now abandoned, which in turn, is a continuation of application Ser. No. 711,910, filed Aug. 5, 1976, now abandoned.

BACKGROUND OF THE INVENTION

1. Field of the Invention

This invention relates to polyolefin film, e.g., polyethylene, polypropylene, polybutene and the like, coated on one side with a heat sealable composition of an acrylic interpolymer and coated on the other side with a heat sealable composition of polyvinylidene chloride copolymer, which is suitable for packaging a variety of items, e.g., foodstuffs.

2. Description of the Prior Art

In the preparation of films useful for packaging purposes, typically separate plies of acrylic coated polyolefin film, e.g., biaxially oriented polypropylene film, have been combined with a PVDC (polyvinylidene chloride) coated cellophane or PVDC coated glassine using conventional adhesive laminating or thermal laminating techniques for application in modern horizontal and vertical form, fill, and seal machines.

The acrylic coated film ply, normally utilized as the outside of the package, displays excellent hot slip and jaw release characteristics, but comparatively poor hot tack or melt strength characteristics. The PVDC coated film ply normally used on the inside displays excellent hot tack, but poor jaw release characteristics and high hot COF (coefficient of friction). Consequently, placement of the acrylic coated ply on the outside, puts the acrylic coating in direct contact with the sealer surfaces where its good hot slip and jaw release characteristics are most essential.

The PVDC coating is normally placed on the inside where it provides good hot tack characteristics where most needed. Hot tack is a characteristics of the coating which is releated to the melt strength of the coating itself, and is specifically the tendency of the films to remain sealed when subjected to a peeling stress while still hot. Additionally, the PVDC coated ply provides a barrier to transmission of gases such as oxygen thus improving the shelf life of the packaged product.

However, with respect to such multiple ply film, problems with hot tack and concomitantly sealing strength are found typically in the aforementioned vertical form, fill and seal applications where a relatively heavy product is being packaged. In standard high speed equipment, the bottom sealer opens immediately after filling is completed, thus subjecting the bottom of the package to the full weight of the product packaged before the partially melted coating in the seal area has hardened. This results in goods dropping out the bottom of the bag.

SUMMARY OF THE INVENTION

This invention is directed to single-ply film having excellent sealing strength and excellent gas barrier characteristics comprising a polyolefin film substrate having a heat sealable acrylic coating on one side and a heat sealable PVDC coating on the other side suitable thereby for replacement of the two-ply laminated structures typically used in the above-described packaging applications and which thereby negate and/or eliminate the above-mentioned problems.

The acrylic coated side is generally the outside of the web; the side in direct contact with the hot sealer surfaces, where good hot slip and jaw release characteristics are required. The PVDC coating is usually on the inside of the web and provides the high seal strength, good hot tack characteristics and barrier properties required for such packaging. This invention further relates to packages and/or packaging materials prepared from said film.

The acrylic coating contains as the film forming agent a resin consisting essentially of an interpolymer comprising (a) from about 2 to about 15 parts by weight of an alpha-beta monoethylenically unsaturated carboxyclic acid selected from the group consisting of acrylic acid, methacrylic acid, and mixtures thereof, and (b) from about 85 to about 98 parts by weight of neutral monomer esters.

The chemical composition of the PVDC coating is not critical to the functioning of this invention. Generally, in order to achieve the desireable gas barrier properties, the vinylidene chloride content of the multipolymer should be at least 80% and may be as high as 92%. The remaining 8-20% may consist of acrylate esters such as methyl, ethyl, butyl and the like, methacrylate esters, particularly methyl, unsaturated nitriles such as acrylonitrile and methacrylonitrile, and unsaturated acids such as acrylic acid, methacrylic acid, itaconic acid and the like.

It is an object of this invention to provide a single-ply thermoplastic film, comprising a heat sealable composition of an acrylic coating on one side and a heat sealable composition of vinylidene chloride coating on the other side, which provides good hot slip and jaw release characteristics, excellent optical properties and improved resistance to the transmission of gases and vapors.

DETAILED DESCRIPTION OF THE INVENTION

The present invention, therefore, embodies thermoplastic film such as polypropylene or polyethylene coated on one side with a heat sealable coating of an acrylic interpolymer and on the other side with a heat sealable polyvinylidene multipolymer. Uncoated oriented, e.g., biaxially oriented, film substrates such as biaxially oriented polypropylene (BOPP) have proven most satisfactory for use in the present invention providing single-ply film suitable for many varied packaging applications.

THE ACRYLIC COATING

The acrylic coating compositions preferred for use in this invention are fully described and prepared in accordance with U.S. Pat. No. 3,753,769, the disclosure thereof is being incorporated herein by reference. Any suitable acrylic-based coating may be used however. Compositions of the acrylic interpolymer in accordance with U.S. Pat. No. 3,753,769 are preferred. Compositions thereof contain a resin consisting essentially of an interpolymer of (a) from about 2 to about 15 parts, and preferably from about 2.5 to about 6 parts by weight of an α-β monoethylenically unsaturated carboxylic acid selected from the group consisting of acrylic acid, methacrylic acid, and mixtures thereof, and (b) from about 85 to about 98 and preferably from about 94 to about 97.5 parts by weight of neutral monomer esters, said neutral monomer esters preferably comprising (1) methyl acrylate or ethyl acrylate and (2) methyl methacrylate. The interpolymer compositions are further characterized by preferably comprising from about 30 percent to about 55 percent by weight of methyl methacrylate when said alkyl acrylate is methyl acrylate, and from about 52.5 percent to about 69 percent by weight of methyl methacrylate when said alkyl acrylate is ethyl acrylate.

In accordance with one aspect of the present invention, it has been found that the aforediscussed desirable properties of a heat sealable acrylic coating resin may be achieved by controlled synthesis of the multipolymers of the present invention.

The acrylic-based polymers possessing the desired properties of Tg (glass transition temperature), acid content, and molecular weight may be produced in accord with the present invention by the proper selection and interpolymerization of the following types of compounds, in the presence of a suitable chain transfer agent such as for example mercaptans or halogenated hydrocarbons:

A. A high Tg monomer;
B. A low Tg monomer; and
C. Acid containing monomers.

Examples of high Tg monomers which may be employed include ethyl methacrylate, methyl methacrylate and others.

Examples of low Tg monomers which may be employed include, for example, lower alkyl acrylates such as methyl, ethyl or butyl acrylates.

Examples of acid monomers which may be employed include, for example, acrylic acid, methacrylic acid, maleic acid, crotonic acid and mixtures thereof.

The polymerization reaction may be advantageously carried out by adding the mixed monomers incrementally during the reaction in order to attain a more nearly homogeneous distribution of monomers in the multipolymer molecules.

The relative proportion of monomers which may be employed to produce the novel multipolymer coating compositions of the present invention may vary and include between about 2 percent and about 15 percent and preferably from about 2.5 percent to about 6 percent of an $\alpha$-$\beta$ unsaturated carboxylic acid or mixtures thereof, and from about 85 percent to about 98 percent, and preferably from about 94 percent to about 97.5 percent by weight of the neutral ester monomers, said monomers having been interpolymerized utilizing known polymerization techniques, such as, for example, emulsion polymerization.

Thus, the present invention embodies, for example, terpolymers that may be prepared by terpolymerizing ethylenically unsaturated monomers including between 2 percent and 15 percent by weight, and preferably from about 2.5 percent to about 6 percent by weight, of an $\alpha$-$\beta$ unsaturated carboxylic acid and preferably acrylic or methacrylic acid and mixtures thereof; 85 percent to 98 percent, and preferably 94 percent to 97.5 percent, by weight of neutral monomer esters comprising (a) an alkyl acrylate ester such as methyl, ethyl or butyl acrylate and (b) alkyl methacrylate esters such as methyl methacrylate or ethyl methacrylate, for example. The monomer components are employed in a ratio such that the alkyl methacrylate monomer is present in an amount of at least 10 percent by weight of the total terpolymer composition and preferably from about 20 to about 80 percent by weight, and the alkyl acrylate monomer component in amounts of at least 10 percent by weight of the total coating composition, and preferably from about 80 to about 20 percent by weight.

It is also an embodiment in the practice of this invention to incorporate a suitable component to the coating composition to impart "hot slip," that is, satisfactory slip properties when the wrapping material or partially wrapped package passes in contact with the heat sealing portions of wrapping apparatus such as heated platens, etc.

Suitable hot slip agents consisting of finely-divided, water-insoluble, inorganic solids are selected, preferably from the group consisting of colloidal silica, diatomaceous earth, calcium silicate, bentonite and finely divided clays, said inorganic solids generally having a particle size between about 10–200 millimicrons. Hot slip is quantitatively defined as the coefficient of friction in contact with a smooth stainless steel plate used when heat sealing the coated film.

Blocking is the tendency of film to adhere to itself when two or more surfaces of the film are held pressed together. Suitable anti-blocking materials for incorporation in the coating compositions of this invention include finely divided waxes and wax-like materials having melting points above the maximum contemplated storage temperatures and which are not soluble in the interpolymer at such temperatures. Specific examples include the natural waxes such as beeswax, carnauba wax, Japan wax, and synthetic waxes such as hydrogenated castor oil and chlorinated hydrocarbon waxes; some anti-blocking materials such as carnauba wax also have cold-slip characteristics. Cold-slip is quantitatively the coefficient of friction at room temperature, that is, the ability of a film to slide satisfactorily across surfaces at room temperature.

THE POLYVINYLIDENE CHLORIDE COATING

PVDC coatings suitable for use in accordance with this invention may be obtained commercially or prepared by any of several techniques well known to the art. One such suitable PVDC coating consists of a heat sealable vinylidene chloride emulsion copolymer prepared in accordance with U.S. Pat. No. 3,714,106, mentioned hereinabove, comprising (A) up to about 95% by weight of vinylidene chloride, preferably 70 to 95% by weight, (B) 0 to about 30% by weight of hydroxyalkyl ester of an alpha, beta-ethylenically unsaturated carboxylic acid, preferably 0.5 to 30 weight percent, more preferably 0.5 to 18 weight percent, (C) 0 to about 3% by weight of sulfoalkyl ester of an alpha, beta-ethylenically unsaturated carboxylic acid, preferably 0.3 to 3 weight percent and more preferably 0.3 to 1.5 weight percent, (D) 0 to about 5% by weight of ethylenically unsaturated carboxylic acid, preferably 0 to 2 weight percent, (E) up to about 29.5% by weight of ethylenically unsaturated monomer, preferably 0 to 29.5 weight percent containing no free acid or hydroxyalkyl groups other than (A), (B), (C) or (D), monomer (E) being present together with the other said monomers to prevent premature crystallization of the copolymer prior to application and to impart flexibility and heat-sealing properties to the dried multipolymer, said polymer containing a minimum of 2% to 4% by weight in total of said monomers (B) and (E) together.

Another highly suitable PVDC coating referred to hereinbefore as a preferred coating is described in co-pending application Ser. No. 506,075, filed Sept. 23, 1974 now U.S. Pat. No. 4,058,649, issued on Nov. 15, 1977.

Typical polymers produced according to this application comprise (A) 50-90% vinylidene chloride, preferably 75-87.5%, (B) 2-45% lower alkyl acrylates, preferably 7-20% methyl acrylate, and (C) 5-15% of an unsaturated carboxylic acid monomer, at least 50% of which is methacrylic acid, preferably 5-10% methacrylic acid. The acid monomer is used to confer a degree of ammonia sensitivity on the polymer resulting in improved film-forming properties.

It should be emphasized that many other different vinylidene chloride multipolymer latexes available as articles of commerce are equally applicable to the pursuit of this invention.

Compounding of Coating Additives with the Basic Multipolymer

It is desirable that the dispersions of the polymers hereinbefore discussed be compounded with specific additives to achieve a balance of properties needed for a useful packaging film.

As is known in the art, waxes may be utilized in film coating compositions. Waxes having melting points from about 55° C. to about 100° C. are particularly preferred. A wide variety of such waxes have been found suitable such as, for example, candellila wax, beeswax, carnauba wax, Japan wax, montan wax, etc. and synthetic waxes such as hydrogenated castor oil, chlorinated hydrocarbon waxes, long chain fatty acid amides, etc. When carnauba wax is employed in such coating compositions, it has been found that from about 2 to about 10 parts by weight based upon the total weight of the multipolymer may be advantageously employed in the form of an aqueous dispersion having an average particle size of about 0.1 micron. A particularly preferred concentration of wax has been found to be about 5 parts per 100 parts of polymer.

The multipolymer compositions of the present invention which contain relatively high amounts of vinylidene chloride, i.e., on the order of from about 75% up to about 90% by weight, result in coated films which exhibit good frictional properties, i.e., films where the coefficient of friction is not so high as to make films inoperable on automatic packaging equipment. However, it has been found desirable in certain instances to add small amounts of finely divided, insoluble materials to lower further the coefficient of friction of such coated films to the values requisite for high-speed packaging operations. From about 0.1 to about 1.0 parts per 100 parts of polymer of finely divided material such as talc, clay, polyvinyl chloride resin, silica, mica and the like may be used. Applicant has found that a preferred formulation is one which contains about 0.25 parts per 100 parts of polymer of talc having an average particle diameter of about 1 micron.

The coating of the film substrate is typically an in-line operation with both sides of the web being coated in separate coating stations provided in the design of the coater. The coater design may also provide for the application of primer coatings specific for each topcoat prior to topcoat application, but incorporation of the priming step is not essential to the concept hereindisclosed.

For applications in which there is a requirement for lap seal formulation (typical in vertical, form, fill, and seal applications), the acrylic coating must seal well to the PVDC coating, in addition to the other requirements above stated.

The following specific examples illustrate the essence of this invention. Preferred techniques are employed which in no way limit the scope of this invention.

EXAMPLE 1

Acrylic Coating Composition

An acrylic multipolymer ammonia water solution prepared according to the teachings of U.S. Pat. No. 3,753,769 had the following properties:

| Composition of polymer | |
|---|---|
| Methyl Methacrylate | 54% |
| Methyl Acrylate | 42% |
| Methacrylic Acid | 4% |
| Composition of solution | |
| Polymer | 22.00% |
| Ammonia | 0.35% |
| Water | 77.65% |
| Solution properties | |
| % non-volatile | 22% |
| pH | 9.2% |
| Viscosity | 18 centipoise |

To this solution are added (A) 40 parts (solid) of an aqueous dispersion of colloidal silica having an average particle size of 20 millimicrons per 100 parts (solid) of polymer, and (B) 5 parts (solid) of an aqueous dispersion of carnauba wax per 100 parts of polymer.

EXAMPLE 2

PVDC Coating Composition

An aqueous PVDC multipolymer latex having the following properties was used:

| Composition of polymer | |
|---|---|
| Vinylidene Chloride | 87.5% |
| Methyl Acrylate | 5.5% |
| Methacrylic Acid | 7.0% |
| Total Solids | 45.8% |

The pH of the latex was adjusted to 7 with dilute ammonia water and 5 parts solid per 100 parts of multipolymer solids of an aqueous dispersion of carnauba wax and 0.5 parts solid per 100 parts multipolymer solids of finely divided talc in the form of an aqueous suspension were added. Additional water was added to adjust the coating solids to 40%.

EXAMPLE 3

An acrylic interpolymer coating, as described hereinabove under "The Acrylic Coating," in U.S. Pat. No. 3,753,769 and in accordance with Example 1 was applied to one side of an oriented polypropylene web, and a PVDC polymer coating, in accordance with Example 2 and as described hereafter under "The PVDC Coating" hereinabove was applied to the reverse side. The oriented polypropylene film used was a composite film of oriented polypropylene having an exterior layered surface of medium density polyethylene. The overall thickness of the base sheet of 0.90 mil with the outer polyethylene layers comprising a thickness of approximately 0.045 mil.

The layered oriented polypropylene film was first corona discharge treated to a wetting tension level of 46–48 dynes/cm prior to coating. Both the acrylic and the PVDC coating were applied using a kiss roll, followed by metering of excess coating with a meyer rod and drying. Typical properties measured as the coated web were as follows:

TYPICAL PROPERTIES - EXAMPLE 3

| Coating Wt (gm/1000 sq. in.) | | .53 (acrylic) 2.25 (PVDC) | |
|---|---|---|---|
| Heat Seals | | PVDC/ PVDC | ACRYLIC/ ACRYLIC | PVDC/ ACRYLIC |

| (a) Flat Seals (gm/in.) (5 psi-2 sec.) | | PVDC/PVDC | ACRYLIC/ACRYLIC | PVDC/ACRYLIC |
|---|---|---|---|---|
| | 200° F. | 35 | 10 | 135 |
| | 210 | 200 | 90 | 125 |
| | 220 | 225 | 120 | 140 |
| | 230 | 275 | 195 | 165 |
| | 240 | 325 | 255 | 170 |
| | 250 | 340 | 300 | 195 |
| | 260 | 350 | 345 | 180 |
| | 270 | 340 | 360 | 185 |
| | 280 | 355 | 420 | 210 |
| | 290 | 400 | 455 | 210 |
| (b) Crimp Seals (gm/in.) (20 psi-⅔ sec.) | 200° F. | 190 | 178 | — |
| | 220 | 245 | 225 | — |
| | 240 | 258 | 328 | — |
| | 260 | 245 | 353 | — |
| | 280 | 220 | 375 | — |
| Blocking (gm/in.) (72 hr. 100 psi-125° F.) | | 1.9 | 3.9 | 3.5 |
| COF | | 0.56 | 0.32 | 0.36 |
| Haze (%) | | 3.1 | | |
| Gloss 45° (%) | | PVDC OUTSIDE | | 83.9 |
| | | ACRYLIC OUTSIDE | | 88.4 |
| Oxygen Transmission (cc/100 in²-24 Hr.-ATM) | | | 1.7 | |
| Water Vapor Transmission (gm/100 in²-24 Hr.) | | | 0.36 | |

EXAMPLE 4

An acrylic interpolymer coating of the type described in Example 1 was applied to one side of a previously primed surface of a 1.25 mil biaxially oriented polypropylene film, and a PVDC coating, in accordance with this invention was applied to the reverse side of the web, which was also primed. The oriented polypropylene film used is a single layered film produced from a non-slip polypropylene having a high isotactic content, and a melt index of 4.5.

Before coating, the film was corona discharge treated to a wetting tension level of 46 dynes/cm. The surface to be coated with acrylic was first primed, using a standard gravure coating apparatus and technique with a poly(ethylene imine) solution consisting of 0.075% by weight of poly(ethylene imine) dissolved in a mixture of 85 percent water and 15 percent ethanol. After drying the primer, the formulated acrylic topcoat of Example 1 was applied.

Next, a primer coating consisting of a single component urethane adhesive* dissolved at an 8% level (by weight) in methyl ethyl ketone was applied via the gravure technique to the reverse side of the web. After drying of the primer, the formulated PVDC topcoat of Example 2 was applied to the urethane primed surface. Both the acrylic coating and the PVC coating were applied using a kiss roll, followed by meyer rod metering of excess coating. Typical properties measured on the coated web were as follows:

*obtained from commercial sources

TYPICAL PROPERTIES - EXAMPLE 4

| Coating Wt. - gm/MSI (gm/per 1000 sq. in.) | | PEI* Primer = .002 Acrylic Coating = 0.62 Urethane Primer = 0.12 PVDC Coating = 1.41 | | |
|---|---|---|---|---|
| Heat Seals | | PVDC/ PVDC | ACRYLIC/ ACRYLIC | PVDC/ ACRYLIC |
| (A) Flat Seals (gm/in.) 5 psi-2 sec. | 200° F. | 120 | 10 | 155 |
| | 210 | 270 | 40 | 180 |
| | 220 | 255 | 65 | 180 |
| | 230 | 245 | 125 | 155 |
| | 240 | 225 | 95 | 195 |
| | 250 | 280 | 205 | 125 |
| | 260 | 295 | 215 | 130 |
| | 270 | 300 | 260 | 170 |
| | 280 | 275 | 195 | 125 |
| | 290 | 330 | 245 | 205 |
| (B) Crimp Seals (gm/in.) 20 psi-2 sec. | 200° F. | 300 | 100 | 185 |
| | 220 | 310 | 170 | 160 |
| | 240 | 328 | 195 | 153 |
| | 260 | 393 | 208 | 203 |
| | 280 | 485 | 255 | 258 |
| Blocking (gm/in. 72 Hr. 100 psi-125° F.) | | 2.5 | 3.8 | — |
| COF (Coefficient of friction) | | .36 | .17 | .29 |
| Haze (%) | | 0.9 | | |
| Gloss 45° (%) | | 94.1 | | |
| Hot Slip (COF 270° F. to Stainless Steel) | | (PVDC) 2.00 | (ACRYLIC) 0.75 | |
| Oxygen Transmission (cc/100 in²-24 Hr.-ATM) | | | 5.85 | |
| Water Vapor Transmission (gm/100 in²-24 Hr.) | | | 0.25 | |

*Polyethylene Imine

Examination of the data presented with the foregoing Examples illustrates the essential features of this invention. That is, a single-ply film has been produced in accordance with this invention, having obvious commercial and economic advantages over multiple ply systems, that is suitable for replacement of multile-ply film now typically used in the heretofore described packaging applications. Accordingly polyolefin film substrates incorporating an acrylic coating on one side and a PVDC coating on the other side as embodied herein are particularly well suited for a variety of packaging applications, e.g., a packaging vehicle for light snacks or heavy food items such as fruits.

It is to be understood that modifications and variations of the preferred embodiments herein-described may be resorted to without departing from the spirit and scope of this invention. Such variations and modifications are within the scope and purview of the appended claims as those of ordinary skill in the art will understand.

What is claimed is:

1. A method of making a package for a product from a single-ply oriented polyolefin film having a heat sealable acrylic-based coating on one side; and a heat sealable polyvinylidene chloride-based coating on the other side comprising:

forming said package from said film with said polyvinylidene chloride-based coating facing inwardly, and with said acrylic-based coating facing outwardly, and heat sealing said film about said product;

wherein said acrylic-based coating consists essentially of an interpolymer of an alpha-beta monoethylenically unsaturated carboxylic acid selected from acrylic acid, methacrylic acid, and mixtures thereof, and neutral monomer esters selected from methyl acrylate, ethyl acrylate and methyl methacrylate; and wherein said polyvinylidene chloride-based coating consists essentially of an interpolymer of vinylidene chloride, an alpha-beta ethylenically unsaturated carboxylic acid selected from acrylic acid, methacrylic acid and mixtures thereof and an ethylenically unsaturated monomer selected from methyl acrylate, ethyl acrylate and mixtures thereof.

2. The method of claim 1 wherein said polyolefin is polypropylene.

3. The method of claim 1 wherein heat is applied to only said acrylic-based coating to seal said package.

4. The method of claim 3 wherein said package is lap sealed.

5. The method of claim 3 wherein said package is sealed with opposing polyvinylidene chloride-based coating surfaces in abutting contact.

6. The method of claim 1 wherein said acrylic-based coating contains from about 2 to 15 parts by weight based on said acrylic-based coating of alpha-beta monoethylenically unsaturated carboxylic acid selected from acrylic acid, methacrylic acid and mixtures thereof and from about 85 to about 98 parts by weight based on said acrylic-based composition of neutral monomer esters selected from methyl acrylate, ethyl acrylate, and methyl methacrylate.

7. The method of claim 1 wherein said acrylic-based coating contains a hot-slip agent consisting of a finely-divided, water-insoluble, inorganic solid and a cold-slip, anti-blocking material comprising finely-divided wax.

8. The method of claim 7 wherein said inorganic solid is colloidal silica.

9. The method of claim 1 wherein said polyvinylidene chloride-based coating comprises about 80%–90% by weight of vinylidene chloride, about 5 to about 10% by weight of methacrylic acid, and about 5%–10% by weight of methyl acrylate.

10. The method of claim 1 wherein said acrylic-based coating comprises from about 50 to about 60% by weight of methyl acrylate and up to about 5% by weight of methacrylic acid.

11. The method of claim 10 wherein said polyolefin is polypropylene.

12. The method of claim 11 wherein said polypropylene is biaxially oriented.

* * * * *